INCREMENTAL DIFFERENTIAL ANALYZER

INVENTORS.
THOMAS D. TRUITT
LEE P. NEUWIRTH
BY
ATTORNEY

Sept. 8, 1964 T. D. TRUITT ETAL 3,148,273

INCREMENTAL DIFFERENTIAL ANALYZER

Filed Jan. 3, 1961 8 Sheets-Sheet 2

INVENTORS.
THOMAS D. TRUITT
LEE P. NEUWIRTH
BY E. A. Petter
ATTORNEY

Sept. 8, 1964 T. D. TRUITT ETAL 3,148,273

INCREMENTAL DIFFERENTIAL ANALYZER

Filed Jan. 3, 1961 8 Sheets-Sheet 3

INVENTORS.
THOMAS D. TRUITT
LEE P. NEUWIRTH

BY [signature]
ATTORNEY

Sept. 8, 1964 T. D. TRUITT ETAL 3,148,273

INCREMENTAL DIFFERENTIAL ANALYZER

Filed Jan. 3, 1961 8 Sheets-Sheet 4

INVENTORS.
THOMAS D. TRUITT
LEE P. NEUWIRTH
BY
ATTORNEY

INCREMENTAL DIFFERENTIAL ANALYZER

Filed Jan. 3, 1961 8 Sheets-Sheet 5

INVENTORS.
THOMAS D. TRUITT
LEE P. NEUWIRTH
BY E.A. Petths
ATTORNEY

Sept. 8, 1964 T. D. TRUITT ETAL 3,148,273
INCREMENTAL DIFFERENTIAL ANALYZER
Filed Jan. 3, 1961 8 Sheets-Sheet 6

| BP4 | BP3 | BP2 | BP1 | BP0 |
|---|---|---|---|---|
| $Y^{N}=1$ | $Y^{N}=0$ | $Y^{N}=0$ | $Y^{N}=0$ | $Y^{N}=0$ |
| | $Y^{N-1}=1$ | $Y^{N-1}=0$ | $Y^{N-1}=0$ | $Y^{N-1}=0$ |
| | | $Y^{N-2}=1$ | $Y^{N-2}=0$ | $Y^{N-2}=0$ |
| | | | $Y^{N-3}=1$ | $Y^{N-3}=0$ |

FIG. 7a

| BP4 | BP3 | BP2 | BP1 | BP0 |
|---|---|---|---|---|
| $Y^{N}=0$ | $Y^{N}=1$ | $Y^{N}=1$ | $Y^{N}=1$ | $Y^{N}=1$ |
| | $Y^{N-1}=0$ | $Y^{N-1}=1$ | $Y^{N-1}=1$ | $Y^{N-1}=1$ |
| | | $Y^{N-2}=0$ | $Y^{N-2}=1$ | $Y^{N-2}=1$ |
| | | | $Y^{N-3}=0$ | $Y^{N-3}=1$ |

FIG. 7b

INVENTORS.
THOMAS D. TRUITT
LEE P. NEUWIRTH
BY E.A. Petto
ATTORNEY

INVENTORS.
THOMAS D. TRUITT
LEE P. NEUWIRTH
BY E. A. Petts
ATTORNEY

Sept. 8, 1964 | T. D. TRUITT ETAL | 3,148,273

INCREMENTAL DIFFERENTIAL ANALYZER

Filed Jan. 3, 1961 | 8 Sheets-Sheet 8

INVENTORS.
THOMAS D. TRUITT
LEE P. NEUWIRTH

BY
ATTORNEY

United States Patent Office 3,148,273 Patented Sept. 8, 1964

3,148,273

INCREMENTAL DIFFERENTIAL ANALYZER

Thomas D. Truitt, Princeton, N.J., and Lee P. Neuwirth, Berkeley, Calif., assignors to Electronic Associates Inc., Long Branch, N.J., a corporation of New Jersey Filed Jan. 3, 1961, Ser. No. 80,307
6 Claims. (Cl. 235—152)

This invention relates generally to digital differential analyzers and more particularly to an incremental differential electrical analyzer for obtaining solutions for differential equations involving a relationship between an independently variable quantity X and a dependently variable quantity Y.

The digital differential analyzer form of computer, as it is known in the prior art, embodies an integrator adapted for solving complex differential equations by digital steps. The digital differential analyzer suggests great promise for solving complex problems because it obtains the advantages of both the digital computer and the analog differential analyzer without suffering the limitations on computation which they each impose. The advantages of the digital computer are obtained by accuracy of solution and by the requirement of a minimum number of components to solve a given differential equation. The advantages of the analog differential analyzer are obtained by ease of programming and by rapid solution to mathematical problems.

In spite of these desirable characteristics and attributes, digital differential analyzers do suffer from the disadvantage of having a low speed-accuracy product. An improvement in accuracy decreases the speed of computation and vice versa, largely because of the use of serial arithmetic within each of the individual integrators. Speed of computation is also materially reduced when the integrators are time shared to reduce the number of computing components.

Additional difficulties present themselves in prior art digital differential analyzers in the form of errors introduced into computations by the occurrence of incremental variables at extremely low pulse rates, in scaling the pulse rates representing the variable derivatives to be integrated, and in determining effective initial conditions to be imposed upon the integrators.

To illustrate the occurrence of these latter difficulties, consider the usual form of digital differential analyzer integrator and the conventional differential notation *dx, dy, dz* which represents corresponding pulse trains or rates which vary as functions of time in discrete steps. In its usual form the digital differential analyzer integrator is known to comprise a Y register or accumulator for accumulating the *dy* pulse rate, an R register into which the contents of the Y register is gated or placed, and suitable means responsive to the *dx* pulse rate for differentially combining the contents of the Y register and the contents of the R register.

The numbers in the Y register may vary in magnitude, both positive and negative. The decimal or binary point is usually located at the extreme left hand end of the register. The number in the R register will increase in a positive or negative direction until either an overflow or an underflow occurs. Such an occurrence produces a *dz* output pulse rate which may be either positive or negative and, the summation of which is proportional to the $\int ydx$ in another integrator.

The dynamic range of the integrator is determined by the length of the Y register which comprises *n* binary or decimal stages. The resolution or number of significant quanta assumed by the variable accordingly becomes $10^n$ or $2^n$. When properly scaled, the Y variable should approach the maximum limit of the register as it assumes its maximum value; this, however, does not mean that the full dynamic range of the integrator is utilized. In fact, if the Y variable assumes a decimal value of, for example, 0.9500, the precision of the variable is not determined by the resolution of the integrator, $10^n$, but rather by the scale which has been assigned to the input incremental variable, *dy*. The scale of the *dy* variable determines the number of decimal or binary places of the Y register which will be utilized; the remaining stages to the right become superflous. If, for example, a scale of unity is assigned to Y and one *dy* pulse is assigned a weight of $10^{-3}$, only the first three most significant places of the Y register will be utilized. Fluctuations in the variable quantity Y which are smaller than $10^{-3}$ will not appear in the Y register even though they may occur in some other stage of the computer and may be significant. In this example Y cannot be recorded to any greater accuracy than one part in one thousand.

In selecting the scale for a particular register it is possible to compute the correct value to be assigned to each R register from the precise initial value of the Y register which it supplies. This procedure is extremely difficult because an R register may supply several Y registers, and each Y register may have several input variables. This procedure consequently requires trial and error methods. In order to avoid this tedious trial and error task it is not uncommon to set each R register to an arbitrarily chosen initial value of 0.5 and suffer the inaccuracies which will result.

Since the Y register always contains a number which is less than one, the output pulse rate *dz*, a product of *ydx*, is always represented by a pulse rate which is less than the input pulse rate *dx*. The "through gain" from *dx* to *dz* is always less than one and the quality of the information passing through one or more integrators is degraded. For very small problems this difficulty may be of little concern, but in programming large problems and those requiring a large dynamic range, this difficulty becomes a serious source of accumulating errors. Some of the *dz* pulse rates may become so small that they very poorly approximate a continuous variable, viz., a small magnitude is represented by very few pulses per unit time.

The occurrence of input pulse rates which are very high results in rate limiting. This may occur, by way of example, when the sum of two input *dy* pulse rates exceeds the clock rate of the computer. A permanent error will be produced in the computation because the Y register is unable to follow such an input unless, of course, appropriate scaling provisions are made.

The present invention relates to an incremental integrator which largely overcomes the enumerated difficulties encountered in prior art digital differential analyzers. In its preferred form it includes a pulse rate multiplier for producing the product of *ydx* at substantially increased speeds. The pulse rate multiplier of the present invention operates on the principle of a "floating point" notation. "Floating point" notation as used herein refers to the manner of recording a number in a Y register in terms of its exponent and mantissa. In decimal notation the mantissa of the number in the Y register is always less than one but greater than or equal to $1/10$; the exponent is always expressed as a power of 10. In binary notation the exponent of this number is always expressed as a power of two, and the mantissa is always less than one but greater than or equal to ½. A zero never appears between the binary or decimal point and the numerals or characters of the mantissa. In either the binary or the decimal notation, as a number changes in magnitude, its exponent either increases or decreases in magnitude, and the numerals or characters in the mantissa either increase or decrease in number with a resultant shift of the mantissa to the left or right relative to the binary or decimal point. Assuming that the mantissa is being stored in a Y register of fixed length, the effect of shifting the mantissa relative to the binary or decimal point is created in the present invention by simply shifting the binary or decimal point relative to the most significant character in the mantissa.

By the use of a "floating point" Y register, the problems occasioned by the low pulse rate errors, effective initial conditions and rate limiting which were present in prior art digital differential analyzers have been in part either entirely eliminated or materially improved.

The present invention can be used with any convenient number notation since a number is never subjected to arithmetic operations within an integrator. In fact, one integrator may use one numerical notation while another integrator within a particular computer may use an entirely different numerical notation because the only communication bewteen computing components or integrators is by means of pulse rates. The embodiment of the invention which is disclosed herein operates on the binary number system; and therefore, the binary number system will be used throughout.

Within the disclosed incremental integrator, operating in conjunction with a "floating point" Y register, are means, such as an X register associated with suitable gates, for receiving and providing a distributed *dx* pulse rate, and for producing a *dz* output pulse rate which is proportional to *ydx*. Means are provided to sense movement to the left or right of the Y register binary point, thereby to control the scale of the X register and the scale of the output pulse rate *dz*. By continuously changing the X register scale in response to movement of the Y register binary point, the *ydx* output is guaranteed always to occur between ½ and the full *dx* pulse rate.

Additional means are provided, which, in response to a change in either the X or Y register scale of one integrator, automatically vary the scale of the input variable to succeeding integrators by directing the *dy* pulse rate into a particular stage thereof. Accordingly, it is an object of the present invention to provide in an incremental integrator means to automatically vary the scale of a dependently variable pulse rate.

Another object of the present invention is to provide in an incremental integrator means to automatically vary the scale of an independently variable pulse rate.

It is another object of this invention to increase the computing speed of an incremental integrator.

Another object of the present invention is to provide an incremental integrator which does not require the establishment of effective initial conditions for accurate operation.

Still another object of the present invention is to provide an incremental integrator which is efficient, reliable, and accurate in operation.

Yet another object of this invention is to provide an incremental integrator which has an improved speed-accuracy product.

These and other objects, features and advantages will be better understood from the following description taken in connection with the accompanying drawings wherein.

Figure 8:
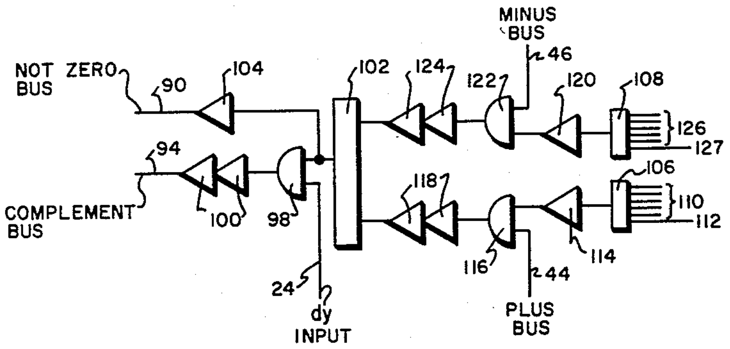
Figure 10:
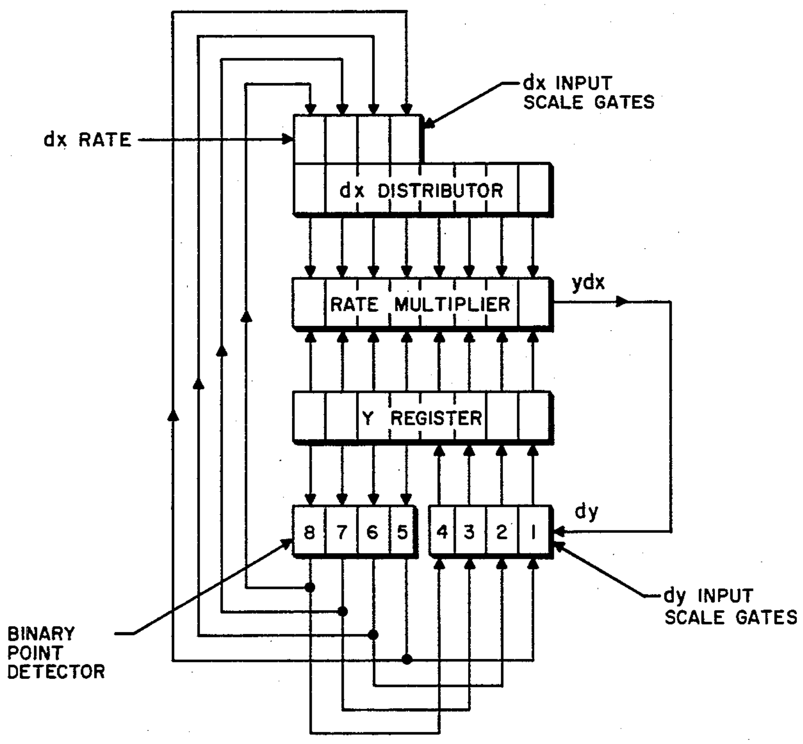
Figure 9:
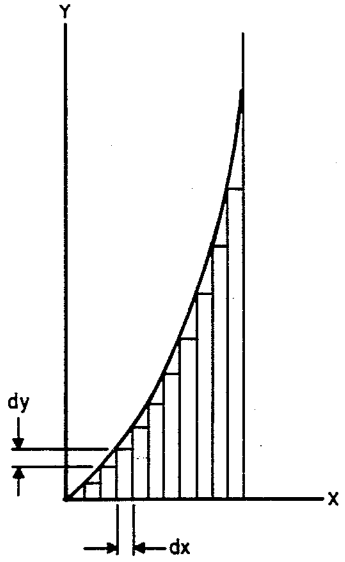
Figure 11:
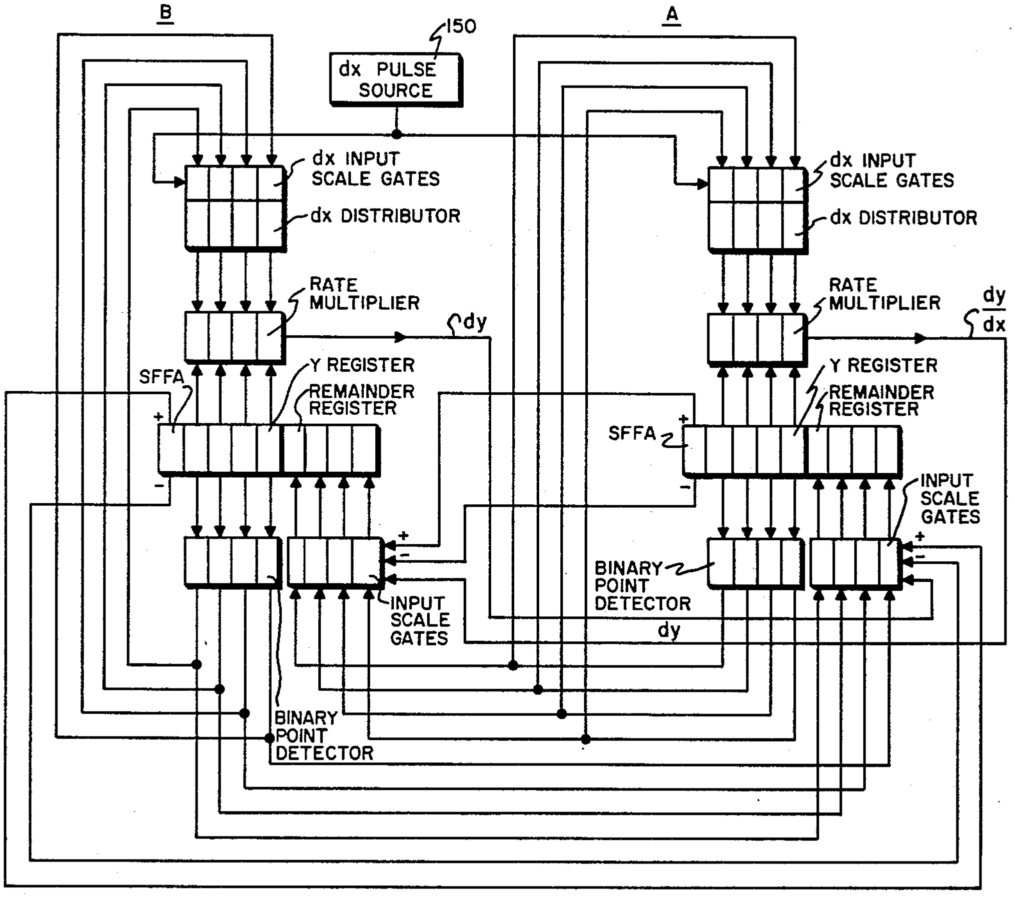
Figure 12:
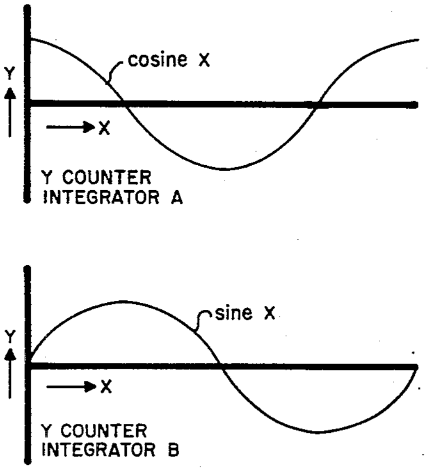

FIGS. 7*a*–7*b* are charts which are useful in understanding the operation of the integrator of the present invention;

FIG. 8 is a logical diagram of a zero sensing circuit used in the integrator of the present invention;

FIG. 9 is a graph showing the solution of a problem solved by the use of the present integrator;

FIG. 10 is a connection diagram of the present integrator for generating the graph of FIG. 9;

FIG. 11 is a connection diagram of two integrators according to the present invention for generating the sine and cosine functions; and FIG. 12 is a graph showing the sine and cosine functions generated by the integrators of FIG. 11.

Figure 1:
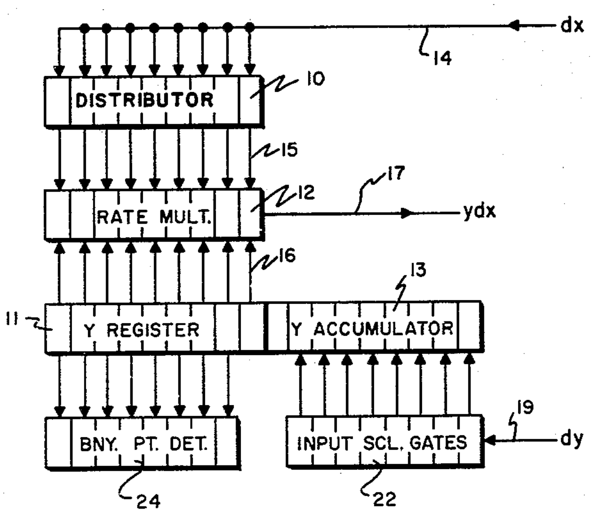
FIG. 1 is a schematic representation of an incremental integrator according to the present invention.

Turning now to FIG. 1, there is shown in block form an incremental integrator embodying the features of the present invention for forming the product of *ydx*. It is shown to comprise a *dx* register or distributor 10 having *n* binary stages, a Y register or accumulator 11 having the same number of binary stages as the *dx* register 10, and a plurality of rate multiplier gates 12, which correspond in number to the *dx* and Y register stages. Y register 11 may be extended an additional *n* stages by another register or remainder accumulator 13, but this extension is optional and not essential to an understanding of the operation of the present invention.

The product of *ydx* is formed by feeding a pulse rate corresponding to an independently variable quantity *dx* into an appropriate stage of distributor 10 along an input line 14. An output line 15 connects each stage of distributor 10 to a corresponding binary gate in the rate multiplier 12. Each stage of the Y register 11 is similarly connected to a corresponding binary gate in the rate multiplier 12 via a conductor 16 for delivering thereto signals corresponding to the magnitude of Y and for gating the *dx* pulses along an output conductor 17 as the product of *ydx*. An input pulse rate, which may correspond to a dependently variable quantity *dy*, *ydx* from another integrator, is delivered to an appropriate stage of the remainder register 13 or to an appropriate stage of the Y accumulator 11 along an input conductor 19 and a scale changing circuit 22. A binary point detector circuit 24 is also associated with Y register 11 for a purpose to be hereinafter described.

Figure 2:
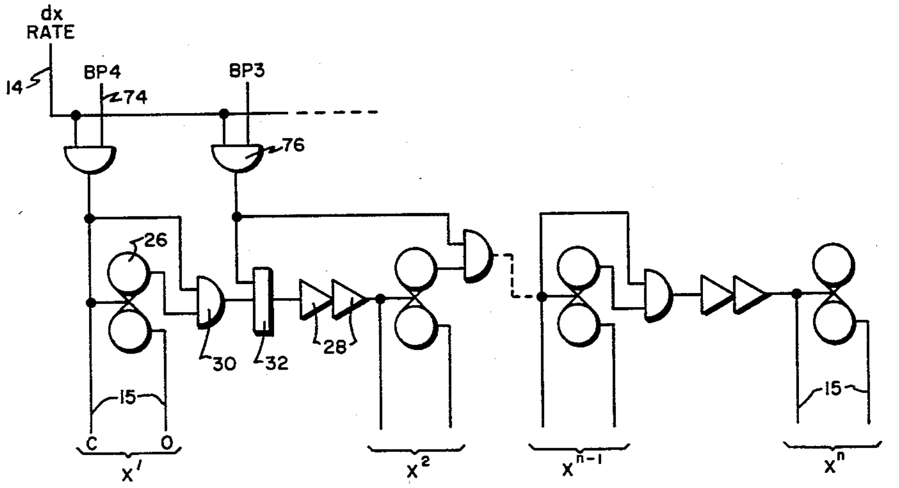
FIG. 2 is a partial logical diagram of a *dx* distributor used in the embodiment of FIG. 1.

The *dx* register 10 of the present invention is shown schematically in FIG. 2 and comprises a binary counter adapted to receive a *dx* pulse rate in any one of the plural stages along the input conductor 14. For purposes of describing the basic operation of the *dx* distributor, the distributor will be considered to count only in one direction, although it may count in both directions, and to receive *dx* input pulses only in the least significant stage $X^1$. In FIG. 2 only the $X^n$, $X^{n-1}$, $X^2$, and $X^1$ stages of the *dx* distributor are shown. Each stage comprises a binary flip-flop 26 of conventional form which is connected to receive an input signal from a preceding stage. A series circuit arrangement of a pair of cathode or emitter follower stages of amplification 28 and a logical "and" circuit 30 is disposed intermediate adjacent flip-flops 26. The stages of amplification 28 allow for inter-stage isolation without altering the circuit logic between counting stages. Selected counting stages, such as $X^1$ and $X^2$, may further include a logical "or" circuit 32 intermediate the logical "and" circuit 30 and the stage of amplification 28 for a purpose to be hereinafter described.

As shown in FIG. 2 and in subsequent figures to be hereinafter described, the binary flip-flops are considered to have an output signal corresponding to binary 1 when the line connected to the upper terminal is enabled and to have an output signal corresponding to binary 0 when the line connected to the lower terminal is enabled. In the *dx* register of the present invention the "carry" from each stage, viz., the signal which is generated at the output terminal of an "and" gate 30 when the stage of the input flip-flop changes from 1 to 0, is applied to a succeeding stage to change the state thereof. A "carry" signal entering a stage will reverse the state of the flip-flop in that stage and will also be applied along a "carry" conductor "C" at that stage. When a flip-flop is in a binary 0 state, a signal is applied from that flip-flop along a zero state conductor "0" at that stage. When both the "carry" conductor "C" and the zero state conductor "0" at any given stage are enabled, it should be apparent that the condition of the corresponding flip-flop has just changed from binary 1 to binary 0. The "carry" conductor "C" and the zero state conductor "0" at each stage comprise a corresponding output conductor 15, and when both the conductor "C" and the conductor "0" at any stage are enabled, an "anti-carry" signal will be applied along the corresponding output conductor 15. The "anti-carry" signals appearing along the conductors 15 will correspond to a distributed $dx$ input pulse rate.

Figure 3:
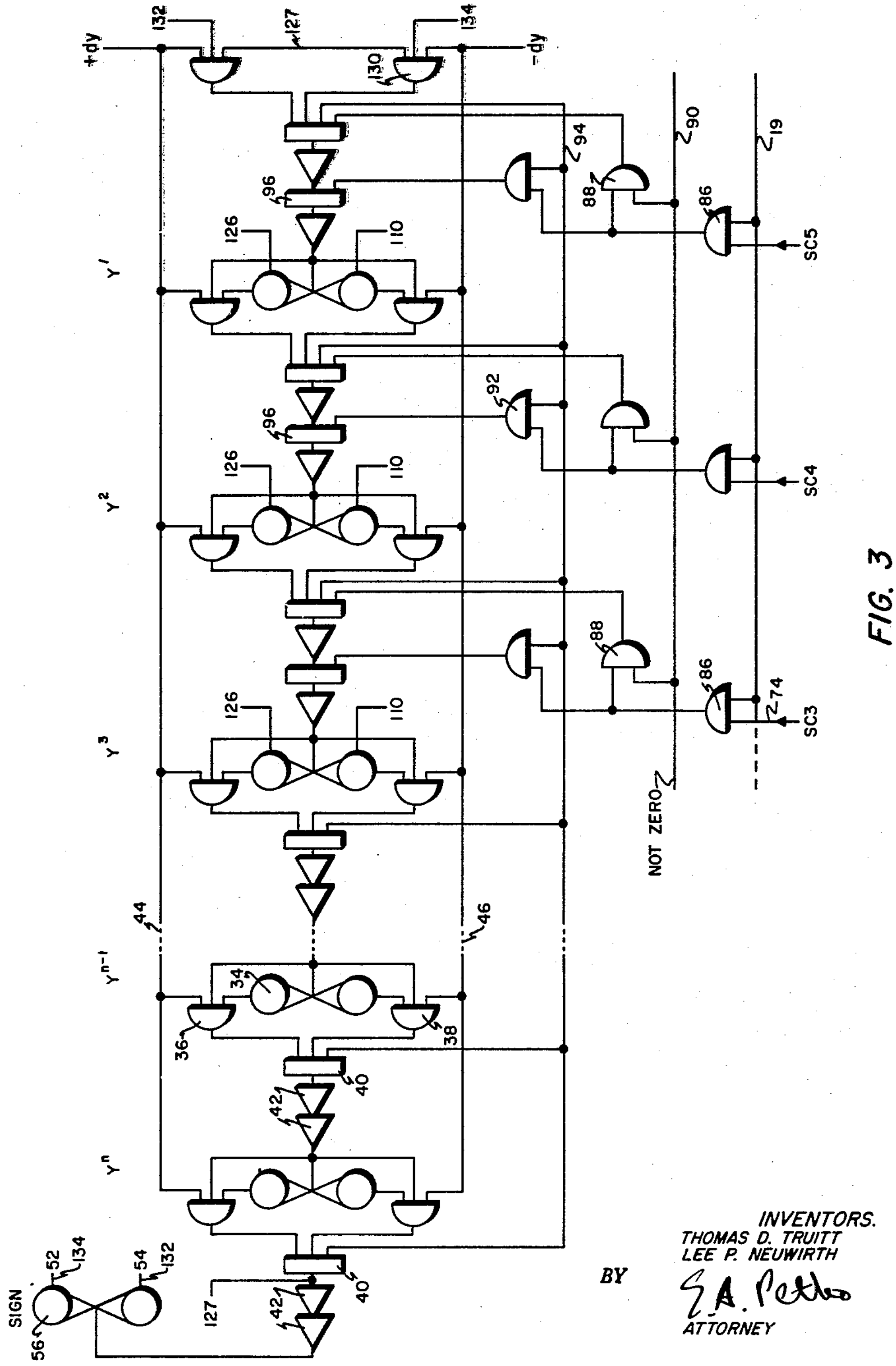
FIG. 3 is a partial logical diagram of a Y register and input scale gates used in the embodiment of FIG. 1.

The Y register 11 and Y accumulator 13 may comprise the same counting logic, viz., a forward-backward or up-down binary counter with additional input logic to permit a specific counting action, to be hereinafter described, when passing through zero. FIG. 3 illustrates the counting logic and coupling between stages of the Y register 11 or Y accumulator 13. Each stage is shown to comprise a binary flip-flop 34 having its 1 and 0 terminals connected respectively to a logical "and" circuit 36 and to a logical "and" circuit 38. The output signals from the logical "and" circuits 36, 38 are applied to a logical "or" circuit 40, which may be similar in design to the "or" circuits 32, and therefrom to a stage of amplification 42, which may be similar in design to the amplification stages 28. The output signal from each amplification stage 42 is applied directly to the next subsequent flip-flop in the Y register or Y accumulator and also to the logical "and" circuits 36, 38 corresponding to the next subsequent stage. A signal which corresponds to the polarity of an input $dy$ signal is applied to either a negative polarity bus 46 or to a positive polarity bus 44. The busses 44 and 46 are connected respectively to each of the "and" circuits 36 and 38 at each of the counting stages. In the present embodiment a signal corresponding to the polarity of Y will appear either upon the bus 44 or upon the bus 46, but never upon both the busses at the same time.

Each Y register stage will count or reverse its state only upon receiving an input pulse from a preceding stage. Whether or not a pulse will be transmitted to a subsequent stage depends upon the condition of the busses 44, 46. For example, if the stage $Y^{n-1}$ is in its 1 state when a $dy$ input pulse is applied to the corresponding "and" circuit 36 from the preceding stage, a signal will be applied to the stage $Y^n$ if "and" circuit 36 is then enabled by a signal on the bus 44. If, however, the "and" circuit 38 is at that time enabled by a signal on the bus 46, no signal will be transmitted to stage $Y^n$ even though the flip-flop 34 for stage $Y^{n-1}$ reverses its state from 1 to 0.

Figure 4:
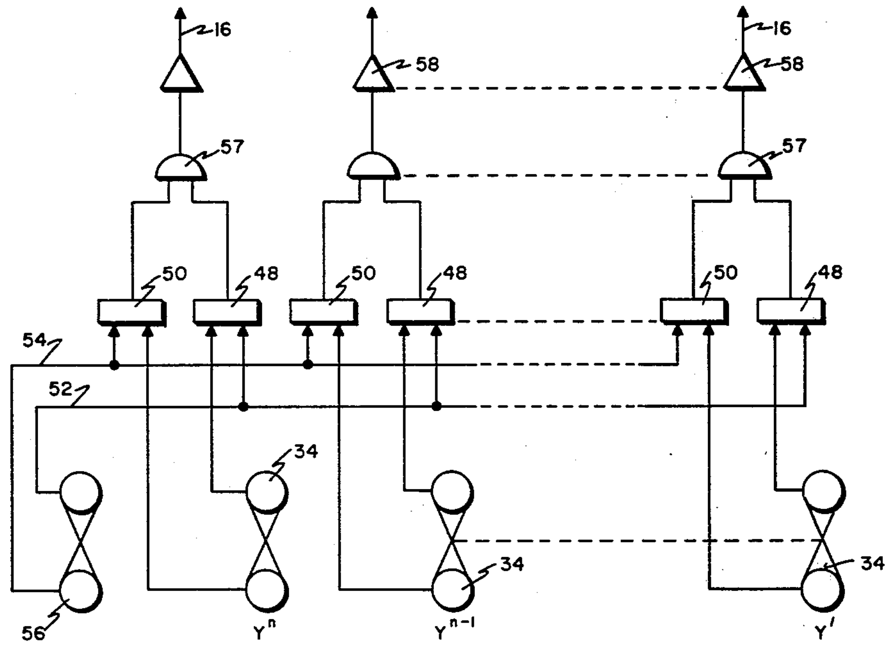
FIG. 4 is a partial logical diagram of absolute magnitude gates used in conjunction with the Y register of FIG. 3.

As shown in FIG. 4, the upper and lower output terminals from each of the flip-flops 34 are connected to a logical "or" circuit. The 1 output terminal from each flip-flop 34 is connected to a corresponding "or" circuit 48 while the 0 output terminal from each flip-flop is connected to a corresponding "or" circuit 50. Each of the "or" circuits 48 receives an additional input signal from an output plus sign bus 52, and each of the "or" circuits 50 receives an additional input signal from an output minus sign bus 54. The busses 52, 54 are connected respectively to the 0 and 1 terminals of a sign flip-flop 56 which is connected to the "and" gates 36, 38 of the register stage $Y^n$ via a stage of amplification 42 and an "or" gate 40. Each of the "or" circuits 48, 50 which correspond to a particular Y register stage, are connected to a corresponding logical "and" circuit 57. The output from each logical "and" circuit 57 is applied via a corresponding stage of amplification and inversion 58 to the corresponding output conductor 16.

The circuit of FIG. 4 insures that the absolute magnitude of the signal in the Y register will be applied to the rate multiplier gates 12. In the instance of a negative number, the upper terminal of each flip-flop or stage in the Y register will correspond to the binary 0 and the lower terminal will correspond to the binary 1. In the instance of a positive number these conditions are reversed at the flip-flops, viz., complemented. The sign signals from the busses 52, 54 will properly polarize the logical "or" circuits 48, 50 to thereby insure the application of the absolute magnitude of the Y register signals upon the output conductors 16. By way of example, if the output plus sign bus 52 is enabled, each of the "or" gates 48 are enabled. "Or" gates 50 will be enabled when the corresponding flip-flop 34 is in the condition of a positive binary 0, viz., a negative binary one. In this condition of the "or" gates, the corresponding "and" gate 57 will produce an output. The stages of amplification 58 are designed to produce an output signal only during absence of an input signal and to produce no output signal during presence of an input signal. Thus, in the described condition, an output signal will be present on the conductor 16. It is important to note that the only time that a signal will not appear on this conductor 16 is when "or" gates 48 and 50 are both enabled, i.e., when a flip-flop is in either its positive or negative binary 1 state.

Figure 5:
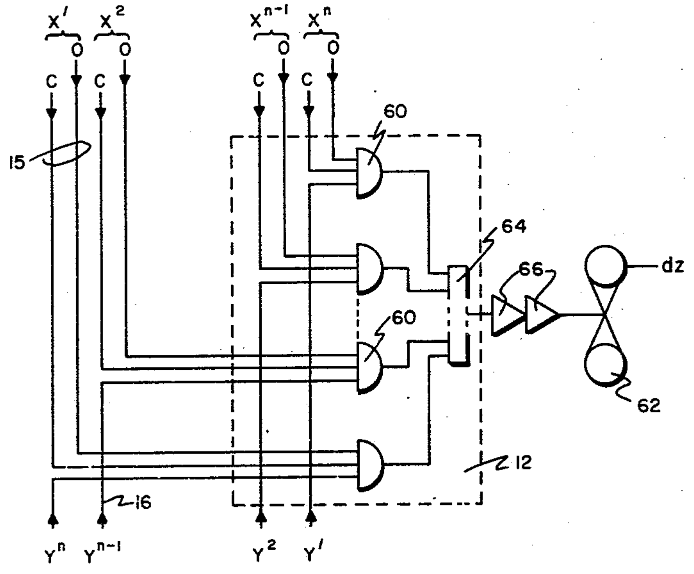
FIG. 5 is a partial logical diagram of the rate multiplier gates of FIG. 1.

As shown in FIG. 5, the rate multiplier gates 12 comprise logical "and" circuit gates 60 which are successively connected to the $n$ stages of the Y register and to the $n$ stages of the $dx$ distributor. The output terminals of the "and" gates 60 are connected to an output flip-flop 62 via a series circuit arrangement of a logical "or" circuit 64 and a stage of amplification 66. The flip-flop 62 provides intermediate storage of the output pulse rate. As explained previously, signals are applied along the output conductors 16 only when a corresponding Y register flip-flop is in its positive or negative binary 1 state. Similarly, output signals are applied along each "carry" line "C" only when a preceding $dx$ distributor flip-flop 26 is complemented from a binary 1 to a binary 0 state. Each conductor "0" will be energized only when a stage or flip-flop 26 in the $dx$ distributor has changed its state from binary 1 to binary 0. The conductor 15 from the most significant bit or stage of the $dx$ distributor is connected to the same "and" circuit 60 as the least significant bit or stage of the Y register, the next less significant bit or stage of the $dx$ distributor is connected to the same "and" circuit 60 as the next more significant bit or stage of the $dx$ distributor, and etc., the least significant bit or stage of the $dx$ distributor being connected to the same "and" circuit 60 as the most significant bit or stage of the Y register.

It should be noted, during presence of each $dx$ pulse, several "carry" pulses may be generated and several "carry" lines "C" may be enabled. However, only one pair of "C"—"0" lines is then enabled, i.e., only one anti-carry signal is generated for each $dx$ input pulse. Thus, during the presence of each $dx$ input pulse only one conductor 15 is enabled. Accordingly, only one of the "and" circuits 60 will be in a condition to conduct during each $dx$ input pulse. Therefore, enabling pulses from the $n$ stages of the $dx$ distributor 10 reach the rate multiplier gates 60 along the conductors 15, lines "C" and "0", from top to bottom at a rate corresponding to $$\frac{dx}{2}, \frac{dx}{4}\ \frac{dx}{8}\ .\ .\ .\ \frac{dx}{2^n}$$

These enabling pulses represent a distributed rate of the discrete variations in the independent quantity $dx$. In turn, the output pulse rate $dz$ is in general equal to $ydx/2^n$.

In making use of the integrator thus far described for the solving of problems, it is to be noted that the output from one integrator may be fed back into one of its own input terminals or into the input terminals of another integrator. In order to transfer once the Y number appearing in a Y register having $n$ stages, $2^n$ $dx$ input pulses must be fed into the integrator. The output pulse rate for an integrator will vary with the magnitude of the number or quantity appearing in the Y register. When Y equals 1, the right hand Y register stage is in its 1 condition, the bottom rate multiplier gate 60 is enabled periodically, and the $dz$ output equals $1dx/2^n$. When Y equals $2^n-1$ all of the Y register stages are in their binary 1 condition, all rate multiplier gates 60 are periodically opened, and the output pulse rate $dz$ equals $$\frac{(2^n-1)dx}{2^n}$$

Figure 6:
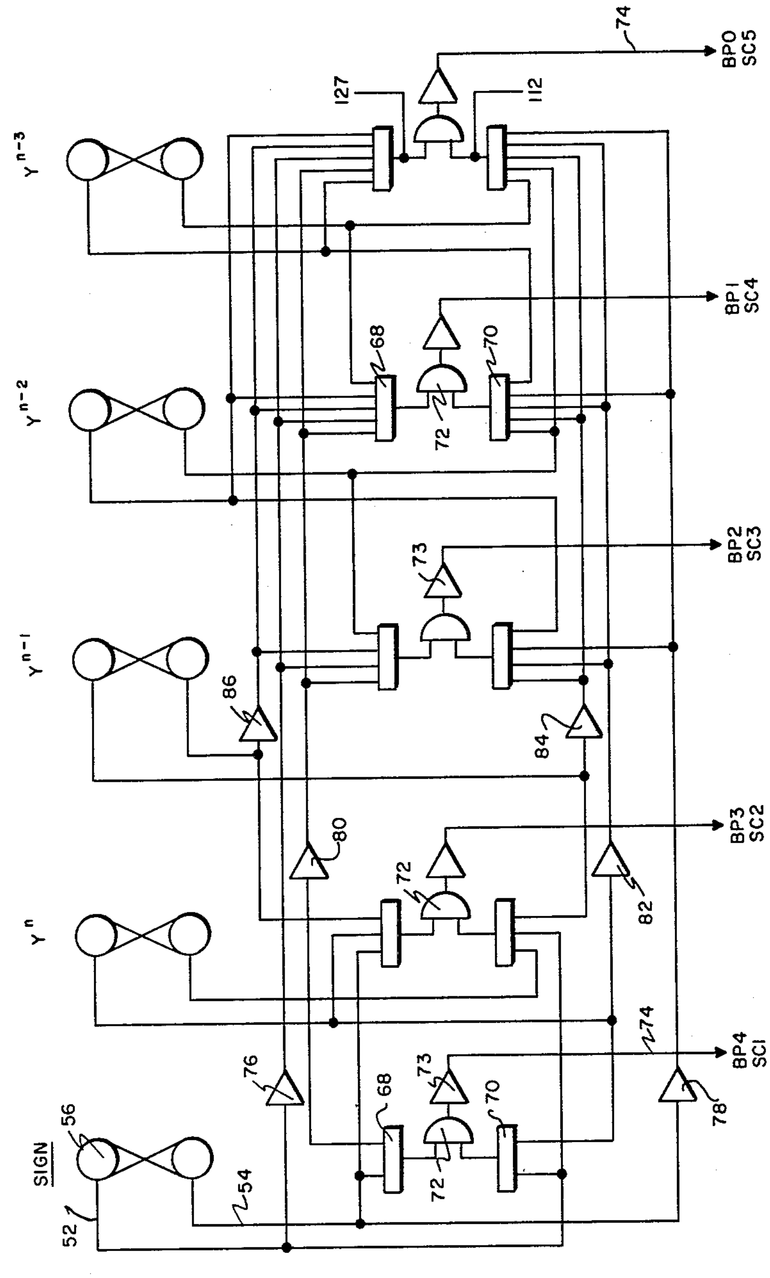
FIG. 6 is a logical diagram of a binary point sensing circuit of the present invention.

To illustrate the "floating point" notation operation of the integrator of the present invention, it is assumed that the present integrator comprises nine bits or stages; it is, however, to be understood that it may comprise any suitable length of odd or even numbered stages. In the present embodiment the four most significant Y register stages, $Y^{n-3}$ through $Y^n$, viz., $Y^6$ through $Y^9$, have their output terminals brought out to the binary point detecting or sensing circuit 24 of FIG. 6 for purposes of sensing the stage in which there is the most significant binary 1, i.e., the binary point. To this end, there is provided at each stage a binary point sensing circuit comprising a pair of "or" gates 68, 70, an "and" gate 72, and a stage of amplification and inversion 73. The sign flip-flop 56 is also provided with a binary point sensing circuit of similar design. The output signals from the "or" gates 68, 70 are applied directly to the corresponding "and" gate 72. Output signals from the "and" gates 72 are applied directly to corresponding output conductors 74. The conductors 74 are further labeled, respectively, from the most significant to least significant Y register stage as: BP4, SC1; BP3, SC2; BP2, SC3; BP1, SC4; and BP0, SC5. The significance of this labeling of the conductors 74 will be hereinafter made apparent.

The "or" gate 70 corresponding to the sign flip-flop 56 is connected to the upper terminal of stage $Y^n$ and to the upper terminal of the sign flip-flop via a conductor 52. The lower terminal of the sign flip-flop and the lower terminal of $Y^n$ flip-flop are connected to the "or" gate 68 corresponding to the sign flip-flop, and to the "or" gate 70 corresponding to the $Y^n$ stage. The "or" gate 70 corresponding to the $Y^n$ stage further receives an input signal from the upper terminal of the $Y^{n-1}$ flip-flop. The lower terminal of the sign flip-flop, the upper terminal of the $Y^n$ flip-flop, and the lower terminal of the $Y^{n-1}$ flip-flop are connected to the "or" gate 68 corresponding to the $Y^n$ stage.

The upper terminal of the sign flip-flop is also connected to the "or" gates 68 corresponding to the $Y^{n-1}$, $Y^{n-2}$ and $Y^{n-3}$ stages via an inverting amplifier 76. The lower terminal of the sign flip-flop is connected to the "or" gates 70 which corresponds to these same stages via a similar inverting amplifier 78. The lower terminal of the $Y^n$ stage flip-flop is connected to the "or" gates 68 corresponding to the stages $Y^{n-1}$, $Y^{n-2}$ and $Y^{n-3}$ via an inverting amplifier 80. The "or" gates 70 corresponding to the stages $Y^{n-1}$, $Y^{n-2}$ and $Y^{n-3}$ stages are connected to the upper terminal of the $Y^n$ flip-flop via an inverting amplifier 82. The upper and lower terminals of the $Y^{n-1}$ flip-flop are connected respectively to the "or" gates 68 and 70 corresponding to the flip-flops $Y^{n-1}$ through $Y^{n-3}$ via inverting amplifiers 84 and 86. These same terminals, namely the upper and lower terminals of the $Y^{n-1}$ flip-flop, are also connected directly to the "or" gates 70 and 68 which correspond to the $Y^n$ stage.

The upper and lower terminals of the $Y^{n-2}$ flip-flop are connected respectively to the "or" gates 68 which correspond to stages $Y^{n-2}$ and $Y^{n-3}$, to the "or" gate 70 which corresponds to stage $Y^{n-1}$, to the "or" gates 70 which correspond to stages $Y^{n-2}$ and $Y^{n-3}$, and to the "or" gate 68 which corresponds to stage $Y^{n-1}$. The upper terminal of flip-flop $Y^{n-3}$ is connected directly to the "or" gate 68 corresponding to that stage and to the "or" gate 70 in the next more significant stage. The "or" gate 68 which corresponds to stage $Y^{n-2}$ and the "or" gate 70 which corresponds to the stage $Y^{n-3}$ are connected to the lower terminal of the $Y^{n-3}$ flip-flop.

When the sign of the signal stored in the Y register is positive, a signal appears at the upper terminal of the sign flip-flop 56, i.e., on the conductor 52. Conversely, when the sign of the signal stored in the Y register is negative, a signal appears at the lower terminal of the sign flip-flop, i.e., on the conductor 54. During presence of a signal on the conductor 52, all "or" gates 70 will be enabled. Similarly, during presence of a signal on the conductor 54, all "or" gates 68 are enabled. It should be noted that output signals will appear on the conductors 74 only during absence of an output signal from the corresponding "and" gates 72. When an "and" gate 72 has an output signal, the corresponding inverting amplifier 73 will not produce an output signal.

FIG. 7*a* shows the condition of the Y register stages which will produce nonconduction of the "and" gates 72 during presence of a positive signal at the sign flip-flop 56. As used in the figure, 1 indicates that the noted stage of the Y register is in its binary 1 condition, viz., an output signal appears at the upper terminal, and 0 indicates that the noted stage of the Y register is in its binary 0 state, viz., a signal appears at the lower terminal.

When all of the stages $Y^n$ through $Y^{n-3}$ are in their binary 0 state, and the sign is positive, all "and" gates 72, with the exception of the "and" gate 72, which corresponds to the BP0 conductor 74, will be in a condition to conduct. Accordingly, only the conductor 74 corresponding to BP0 will have an output signal appear thereupon. A signal will appear on the conductor 74 which corresponds to BP1 only when the $Y^{n-3}$ stage is in a binary 1 condition and the stages $Y^n$–$Y^{n-2}$ are in their binary 0 condition; a signal will appear on the conductor 74 which corresponds to BP2 only when the $Y^{n-2}$ stage is in a binary 1 condition and the $Y^n$ and $Y^{n-1}$ stages are in a binary 0 condition. When stage $Y^{n-1}$ is in a binary 1 condition and stage $Y^n$ is in a binary 0 condition, a signal will appear on the conductor 74 which corresponds to BP3. When the $Y^n$ stage is in a binary 1 condition an output signal will appear on the conductor 74 which corresponds to BP4.

It is to be further noted, when more than one of the four most significant Y register stages are in a binary 1 condition, only the conductor 74 which corresponds to the most significant binary 1 will be enabled. For example, if it is assumed that stages $Y^{n-1}$, $Y^{n-2}$ and $Y^{n-3}$ are in their binary 1 conditions, it is seen in FIG. 7*a* that the "and" gates 72 which correspond to BP2 and BP1 are in a condition to conduct; and "and" gate 72 which corresponds to BP3 is not in a condition to conduct; therefore, the corresponding conductor 74 is enabled.

FIG. 7*b* is similar to FIG. 7*a* and shows the condition of the Y register stages which will produce nonconduction of the "and" gates 72 during presence of a negative signal at the sign flip-flop.

In the presence of a negative sign, with the stages $Y^n$ through $Y^{n-3}$ in a binary 1 state, all "and" gates 72, with the exception of the "and" gate 72, which corresponds to the BP0 conductor 74, will be in a condition to conduct. Thus, a signal appears on this conductor whenever stage $Y^{n-3}$ and all more significant stages are in a negative binary 0 condition. Signals appear on the conductors 74 corresponding to BP1, BP2, BP3 and BP4 when and only when the Y register stages $Y^{n-3}$, $Y^{n-2}$, $Y^{n-1}$ and $Y^n$ are respectively in their negative binary one conditions and no more significant stage is in a negative binary one condition. As should be obvious from FIG. 7*b*, only the conductor 74 which corresponds to the stage containing the most significant negative binary 1 will be enabled when more than one of the stages are in a negative binary 1 condition.

The conductors 74 are connected to the *dx* distributor stages $X^1$ through $X^5$ for gating the *dx* input pulse rate into the stage of the *dx* distributor 10 which is opposite the Y register stage containing the most significant binary 1. To this end, conductors 74, corresponding to BP0–BP4, are connected respectively to the *dx* distributor stages $X^1$ through $X^5$ via suitable corresponding "and" gates 76 as shown in FIG. 2. Each of the "and" gates 76 receive an additional input signal from the *dx* rate bus 14; each "and" gate 76 is connected directly to the corresponding *dx* distributor stage. In the condition where none of the stages $Y^n$ through $Y^{n-3}$ contain a binary 1, the "and" gate 76 which corresponds to the conductor BP0 will be enabled and the *dx* input pulse rate is applied to the *dx* register stage $X^5$ which corresponds thereto. In this condition the $Y^{n-3}$ stage of the Y register will be gated at a rate corresponding to $dx/2$ rather than at a rate corresponding to $dx/32$, as previously described. Similarly, the *dx* input pulse rate can be gated into any one of the other *dx* distributor stages $X^1$ through $X^4$ in response to the location of the most significant binary 1 in the Y register. As it is apparent, whenever the Y register contains a binary 1 in the stage $Y^5$ or in a more significant stage, the Y register stage containing the most significant binary 1 will always be gated at a $dx/2$ rate by the pulse output from the *dx* distributor.

Whenever the most significant binary 1 is located in a Y register stage which is of less significance than the stage $Y^5$, the *dx* pulse rate will be applied to the *dx* distributor stage $X^4$, and in turn, the most significant binary 1 stage of the Y register will not be gated at a $dx/2$ rate. However, by extending the binary point detector circuit and the *dx* input scale gates so that they are associated with each of the Y register and *dx* distributor stages, the *ydx* rate output from an integrator according to the present invention will always occur between ½ and the full *dx* pulse rate being applied to the integrator, irrespective of the magnitude of the quantity in the Y register. Accordingly, the *dz* output will be more significant than it would be otherwise; that is, more output pulses will be produced per unit of time than would be produced by prior art integrators. The full dynamic capabilities of the integrator are more nearly utilized by this arrangement without sacrificing any accuracy of computation. In the present example of this incremental integrator, it is assumed that when a most significant binary 1 occurs in a stage of the Y register which is less significant than $Y^5$, the accuracy of computation is not effected. Accordingly, for purposes of this description, the most significant binary 1 stage of the Y register, irrespective of the magnitude of the quantity it contains, is always considered to be gated at least at a $dx/2$ rate.

It is to be noted, however, that provisions are required for sensing a change in the significance of the output pulse rate in order to prevent the occurrence of errors in subsequent integrators. The signals appearing on the conductors 74 are utilized to this end by application to *dy* input scale gates 22.

In FIG. 3, each of the conductors 74 which are labeled SC1–SC5 are shown to be connected to a corresponding "and" gate 86. Each "and" gate 86 receives another input signal from the *dy* input bus 19. For purposes of the present explanation, it is assumed that a rate signal always appears on the bus 19. The output terminal of each "and" gate 86 is connected to one input terminal of an "and" gate 88. Each "and" gate 88 receives another signal from a "not zero" bus 90. In the present description, the "not zero" bus 90 is also considered to have a continuous signal thereon. The output terminal of each "and" gate 88 is connected to a corresponding "or" gate 40 at one of the stages $Y^1$ through $Y^5$ of the Y register.

The output terminal of each "and" gate 86 is further connected to one input terminal of an "and" gate 92. Another input signal is provided for each "and" gate 92 from a complement bus 94. The output terminal of each "and" gate 92 is connected to a corresponding "or" gate 96. The "or" gates 96 correspond respectively to the Y register stages $Y^1$ through $Y^5$ and are disposed intermediate the stages of amplification 92 corresponding to these stages for a purpose to be hereinafter described. The complement bus 94 is also connected to each of the "or" gates 40.

As was explained previously, signals appear along the conductors 74 according to the significance of the binary quantity in the Y register. These same said signals control the significance of the *ydx* output signal in a subsequent Y register. If the *ydx* output from the present integrator is fed back upon itself as a dependently variable quantity *dy* along the conductor 19, the signals appearing on the conductors 74 will be utilized to gate this *dy* input into an appropriate Y register counting stage. It is to be noted that the conductor 74 which corresponds to the $Y^n$ register stage will be connected to the $Y^5$ register stage and etc. with the conductor 74 which corresponds to the $Y^5$ register stage being connected to the $Y^1$ register stage. The input "and" gates 86 will thus be opened in dependence upon the magnitude of the quantity in the Y register.

In the instance where the Y register has a binary 1 appearing in its most significant stage, the signal appearing on the conductors 74 which is labeled BP0, SC1 will enable the Y input gate 86 which corresponds to the Y register stage $Y^5$. In the instance where the most significant binary 1 appears in the Y register stage $Y^5$, a signal will appear on the conductor 74 which corresponds to BP0, SC5 for enabling the Y register input gate 86 which corresponds to the stage $Y^1$. Thus, even though a *dz* output signal occurs at a rate corresponding to at least one half the *dx* input rate, the significance of this signal in a subsequent integrator is scaled upwardly or downwardly in proportion to the significance with which it has occurred in a previous integrator.

In order to illustrate the operation of the present integrator in counting through 0, reference is now made to FIG. 8. The circuit of FIG. 8 generates output signals for application to the complement bus 94 and signals for application to the "not zero" bus 90. To this end, the *dy* input bus 19 is connected to one input terminal of a two input "and" gate 98. The output terminal of "and" gate 98 is connected directly to the complement bus 94 via a stage of amplification 100, which may be similar in design to the stages of amplification 42 or 28. Another input signal is applied to the "and" gate 98 from an "or" gate 102. The output signal from the "or" gate 102 is also applied directly to the "not zero" bus 90 via an inverting amplifier 104. Input signals to the "or" gate 102 indicate the presence or absence of either a negative 0 or a positive 0 condition in the Y register. A signal is applied to the "or" gate 102 only when the Y register is a negative 0 or positive 0 condition. Absent these conditions, there is no input to the "or" gate; thus, the "not zero" bus 90 is enabled at all times except when the Y register contains a negative or positive zero.

The condition of the Y register is sensed by a zero test circuit which comprises a pair of "or" gates 106, 108. The "or" gate 106 receives input signals from the lower terminal of each of the flip-flops in the Y register. As shown in FIG. 8, the stages $Y^1$ through $Y^5$ are individually connected to the "or" gate 106 via the conductors 110. The condition of the Y register stages $Y^6$ through $Y^9$ is sensed at the output terminal of "or" gate 70 which corresponds to the Y register stage $Y^{n-3}$; "or" gate 106 is connected to "or" gate 70 by a conductor 112. As should be apparent from the previous description of the binary point sensing circuit, this "or" gate 70 has no output signal only when all of the flip-flops $Y^6$–$Y^9$ are in their binary 1 state.

In the absence of an input signal at "or" gate 106, the stage of amplification 114, which is connected in its output circuit, will produce a signal for application to the "or" gate 102. As should be evident, in order for amplifier 114 to produce an output signal, all of the flip-flops in the Y register must be in their binary 1 condition, viz., negative zero. The output terminal of amplifier 114 is connected to the input terminal of an "and" gate 116 which receives another input signal from the input plus sign bus 44. The output circuit of "and" gate 116 is connected to the "or" gate 102 via a stage of amplification 118.

The "or" gate 108 is connected to the input terminal of the "or" gate 102 in a manner similar to that of "or" gate 106 via a stage of amplification 120, a two input "and" gate 122, and a suitable stage of amplification 124. The "and" gate 122 receives an additional input signal from the input minus sign bus 46. In the case of the "or" gate 108, input signals are received from the upper terminals of each of the flip-flops in the Y register. As in the case of the "or" gate 106, the Y register stages $Y^1$ through $Y^5$ are connected individually to the "or" gate by the conductors 126. The upper terminals of the Y register stage $Y^6$ through $Y^9$ are sensed at the output terminal of "or" gate 68 corresponding to the Y register stage $Y^{n-3}$, and a signal indicative of their condition is applied to the "or" gate 108 via the conductor 127.

In order to illustrate the operation of the circuit of FIG. 8, consider first the condition where the sign of the signal in the Y register has a negative polarity and is increasing positively. Negative 0 will be displayed in the Y register when the flip-flops display the binary number 111111111. Absent the circuit of FIG. 8, the very next *dy* input pulse would cause the Y register flip-flops to complement, viz., to produce positive 0, which is 000000000. It should be apparent that the number which should then appear in the Y register is 000000001. The circuit of FIG. 8 achieves this result. In the condition where all Y register flip-flops are in their binary 1 condition, there is no signal on any of the conductors 110 or on the conductor 112. "Or" gate 106 does not produce an output signal and consequently inverter amplifier 114 applies a signal to the "and" gate 116. Since the plus input sign bus 44 is then enabled, the "and" gate 116 will conduct and a signal will be applied to "or" gate 102. The "not zero" bus 90 will be disabled, all "and" gates 88 will be disabled, and an input signal will be applied to the "and" gate 98.

Upon occurrence of the next subsequent *dy* input pulse the "and" gate 98 will conduct and complement bus 94 is enabled. Assuming that this *dy* input is then incrementing the Y register along the conductor 74 which corresponds to SC5, it should be apparent that this pulse will be applied to the "or" gate 98 which corresponds to Y register stage $Y^1$ via "and" gate 92. When complement bus 94 is enabled, a signal is applied to each of the "or" gates 40 and each of the flip-flops 36, the sign flip-flop 56 and excepting the flip-flop 36 connected to stage $Y^1$, are complemented. The effect of the *dy* input pulse occurring at "or" gate 96 while the complement bus 94 is enabled prevents the $Y^1$ stage flip-flop from being incremented. As is apparent, the Y register will now display the binary number 000000001 as it should, and the sign flip-flop now indicates a positive polarity also as it should.

Because of the "floating point" notation of the present integrator it is possible that the Y register does not contain the binary number of the previous illustration when it is desired to count through 0. Assume now that the register contains a negative number which is being incremented in a positive direction; further assume that the number displayed in the counter is 111111110 and that the conductor 74 which corresponds to SC4 has just been enabled by the preceding *dy* input pulse. Obviously, the next *dy* input pulse will increment the $Y^2$ stage of the Y register and the Y register will be required to count through 0 because of the increased weight of this input pulse, although the 0 detector circuit is not then in a condition to enable the complement bus. A *dy* input pulse into the $Y^2$ stage of the Y register will cause the Y register stages $Y^2$ through $Y^n$ to individually invert or complement their count, and in so doing each register will generate a "carry" pulse for application to a succeeding stage. The "or" gate 40 for the sign flip-flop 56 will be enabled to change the state of this flip-flop from 0 to 1. A signal will appear on the line 127 when the sign flip-flop "or" gate 40 is enabled and this signal will be applied to the pair of "and" gates 128, 130, which are connected to the "or" gate 40 in the input circuit of the $Y^1$ register stage.

The gates 128, 130, it will be noted, also receive input signals from the plus and minus input busses 44, 46 respectively. Conductors 132, 134 are connected respectively to the lower and upper terminals of the sign flip-flop 56. When conductor 127 is enabled, the conductor 132 is then also enabled and the "and" gate 130 is in a condition to conduct. Thus, when the stages $Y^2$ through $Y^n$ are complemented, an "end around carry" is generated via the 127 and the sign flip-flop 56 to produce a binary 1 in the least significant Y register stage. Whenever a Y register contains a positive number and it is being incremented in a negative direction, an "end around carry" will be generated via the conductor 127, the "and" gate 130, and a signal from the sign flip-flop via the conductor 134. The "end around carry" signal is generated whenever a *dy* input pulse into any Y register stage causes the Y register sign flip-flop to be complemented. The circuit of FIG. 8 is operative only when the *dy* input is incrementing the Y register while it is at plus or minus zero.

An example of the operation of the present integrator will now be made with reference to FIGS. 9 and 10. In FIG. 10 a signal integrator according to the present invention is schematically illustrated as being connected to solve the simple differential equation $$R=\frac{dy}{dx}$$

FIG. 9 illustrates this equation as it is generated by the integrator of FIG. 10.

The only components which are illustrated in the schematic representation of FIG. 10 are an eight stage *dx* distributor, an eight stage Y accumulator or register, eight stages of rate multiplier gates, the binary point sensing circuits, and the input scale gates. In the arrangement of the present integrator four stages of binary point and input scale gates are utilized. The present function to be integrated will be assumed only to have one polarity or sign, and accordingly, the operation of the heretofore described sign changing circuits and circuits for counting through zero will not be considered or further described.

A *dx* input pulse rate of any suitable magnitude or rate is applied along an input conductor directly to the *dx* input gates which are controlled by the binary point detector. An output pulse rate *ydx* is applied directly from the rate multiplier gates to the input scale gates of the present integrator and therefrom directly to the Y register as an input pulse rate *dy*. The binary point detector gates are shown in FIG. 10 as being associated with the 4 most significant Y register stages and the *dy* input scale gates are shown in this figure as being associated with the four least significant Y register stages. The binary point detector circuit is connected to the *dx* input scale gates and to the *dy* input scale gates of the present integrator as has been heretofore described.

If it is assumed that the Y register stage 5 is initially in a binary 1 condition at the beginning of a computation, with the other Y register stage in the binary 0 condition, the *dx* input rate will be applied along the input conductor to the *dx* distributor stage four as a result of the heretofore described operation of the binary point detector circuit. The sensing of a binary 1 in the Y register stage 5 also enables the *dy* input scale gate 1 as heretofore described and the $ydx$ output from the rate multiplier is applied to the Y register stage 1 for incrementing the Y register. It will be observed that each $dy$ input pulse from the rate multiplier will increment the Y register at a rate which is $\frac{1}{16}$ the weight or significance of the quantity in the Y register stage 5, viz., the binary point stage 5 is displaced by five stages from the $dy$ input stage 1.

If it is assumed that the magnitude of the quantity in the Y register does not vary while it is being transferred by the $dx$ input pulse rate, 32 $dx$ input pulses will be required to transfer once the contents of the Y register. Assuming again that a binary 1 appears only in the Y register stage 5, 16 $ydx$ output pulses will be produced at the rate multiplier gates by these 32 $dx$ input pulses. Since, in the present example, the magnitude of the quantity Y varies in magnitude while being transferred by the $dx$ pulse rate, less than 32 $dx$ input pulses are required to transfer once the quantity in the Y register. In the present example, after 22 $dx$ input pulses, 16 $ydx$ pulses will have been generated and these pulses will have incremented the Y register to produce the condition where a binary 1 appears in the Y register stage 6.

The binary point detector will sense the condition of a most significant binary 1 in the Y register stage 6 and will cause the transfer of the $dx$ input pulse rate to the $dx$ distributor stage 3. In turn, the $dy$ input will be transferred to the input scale gate 2. In this condition the Y register stage 6 will be gated at ½ the $dx$ input pulse rate and the Y register will be incremented at $\frac{1}{16}$ the weight of the Y register stage 6. Accordingly, the magnitude of the quantity in the Y register will now vary at twice the rate it varied when the Y register stage 1 was being incremented by the $dx$ input pulse rate.

After 22 additional $dx$ input pulses the most significant binary 1 will appear in the Y register stage 7, and after 22 additional $dx$ input pulses the most significant binary 1 will appear in the Y register stage 8. In these conditions of the Y register the $dy$ input will be applied first to the Y register stage 3 and then to the Y register stage 4. As should be apparent, the weight or significance of the respective $dy$ increments is four and eight times as great as when the $dy$ input is applied to the Y register stage 1.

Observing the operation of the integrator of the present example with reference to FIG. 9, it will be apparent that each $dy$ increment is of a less significant weight when the slope of the function being generated has a rapidly varying rate and is of a more significant weight when the slope of the function being generated is varying more slowly. With this arrangement of the present integrator, greater accuracy of computation is realized while the inherent speed of the integrator is being more favorably utilized. Irrespective of the location of the binary point, five stages of resolution or accuracy are obtained without suffering any reduction in computing speed.

Another example of a problem that can be solved using the present integrator is the simultaneous generation of the sine and cosine functions which can be expressed as the solution of the simple differential equation $$\frac{d^2y}{dx^2}=-Y$$

The pair of integrators A and B shown in FIG. 11 illustrate the interconnections required to physically generate the solution to the above equation. As in FIG. 10, the various components of the integrators A and B are shown schematically in block form. The sign flip-flop stages are shown in block form for the integrators A and B and are designated respectively SFFA and SFFB. A common $dx$ pulse source of suitable frequency is provided for both integrators and is designated by the reference numeral 150.

In order to prevent variations in the magnitude of the number in the Y register of the integrators while the number in the Y register is being transferred once by the distributed $dx$ pulse rate, the Y registers in FIG. 11 have been extended by a corresponding Y remainder register, as is well known. The $dy$ input scale gates of the present invention are in turn connected to the corresponding remainder register. As in the previous example of FIG. 10, the binary point detector circuits at each integrator are connected to the corresponding $dx$ input scale gates as was previously explained.

If it is assumed that the integrator A is generating the cosine function while the integrator B is generating the sine function, it is well known that the combined Y register and remainder register of each integrator will assume a maximum value whenever the other integrator assumes a minimum value and vice versa. Thus, assume initially that the combined Y register and remainder register of integrator A is set to a maximum positive value, positive binary 1 in each register stage, that the combined Y register and remainder register of integrator B is set to a minimum positive value, positive binary 0 in each register stage, and that SFFA and SFFB are set to indicate a positive number in each corresponding Y register. If it is further assumed that the quantity in the combined Y register and remainder register of integrator A corresponds to $d^2y/dx^2$, the $dz$ output from the corresponding rate multiplier will be equal to $$Z=\int\frac{d^2y}{dx^2}dx=\frac{dy}{dx}$$

This output is fed along the $dz$ output line labeled $dy/dx$ to the $dy$ input scale gates of integrator B. The plus sign terminal of flip-flop SFFA is connected to the corresponding plus sign bus at the $dx$ input scale gate corresponding to integrator B. The minus sign terminal of flip-flop SFFA is also connected to the minus sign bus at the $dx$ input scale gate corresponding to integrator B.

The pulse input quantity $dy/dx$ will be integrated by the integrator B and the output therefrom will be equal to $$Z=\int\frac{dy}{dx}dx=Y$$

In turn, the output pulse rate from integrator B is fed outwardly of the corresponding rate multiplier on the $dz$ output line labeled Y to the $dy$ input scale gates of integrator A. This latter connection, as should be apparent, represents the completion of the quantity $$\frac{d^2y}{dx^2}=-Y$$

of the initial differential equation. In order to produce the proper sign of the quantity Y in this differential equation, the plus and minus terminal of sign flip-flop SFFB are connected respectively to the minus and plus sign busses at the $dy$ input scale gate of integrator A.

The generation of the solution to the differential equation is started when the $dx$ pulse source 150 is triggered to feed $dx$ pulses to the $dx$ scale gates at the integrators A and B. Since the most significant binary "one" in the intergrator A is initially located in the most significant Y register stage, the $dx$ input will be fed initially into the most significant stage of integrator A's $dx$ distributor. In integrator B, since all stages of the Y register and remainder register are initially set to a positive binary zero, the binary point detector circuit will sense this condition and cause the $dx$ input to be fed initially into the least significant stage of this integrator's $dx$ distributor.

Referring now to FIG. 12, which show graphically the contents of the Y registers for integrators A and B, it will be apparent that immediately upon receipt of $dx$ pulses from the source 150, the initial positive output pulses from integrator B are made negative at the $dy$ input scale gates of integrator A to begin to decrease the value of the quantity in the Y register of integrator A. In turn, the output pulses from integrator A, which are fed into the input scale gates of integrator B with a positive sign, will begin to increase the value of the quantity in the Y register of integrator B.

When the value of Y in integrator A reaches zero, an extra pulse will be generated in the Y counter. This pulse will cause the Y counter to count through zero, as previously described, and will trigger the associated sign flip-flop SFFA to indicate an opposite polarity for the quantity Y. The output pulses from integrator A will now cause the quantity in the Y register of integrator B to start decreasing. When the value of the quantity in the Y register of integrator A reaches zero, the value of the quantity in the Y register of integrator B reaches its maximum positive value and does not produce any change in the state or condition of sign flip-flop SFFB. The output pulse rate from integrator B, although still of a positive polarity, is received at the *dy* input scale gates of integrator A as a negative quantity. However, this negative *dy* input pulse rate will now increase in value until a maximum negative value is reached when the Y register of integrator B reaches its minimum value.

Although not shown in FIG. 12, it should be apparent from the previous discussion with respect to FIGS. 9 and 10, the weight of the *dy* increments will vary with respect to the fixed *dx* increments throughout the generation of the sine and cosine functions. The weight of the *dy* increments will be most significant when the respective functions cross their respective X ordinate axes and will be least significant when the respective functions attain their maximum amplitude or value.

While only more or less specific structural features of the present invention have been shown and described herein, and inasmuch as this invention is subject to many variations, modifications and reversals of parts, it is intended that all matter contained herein shall be interpreted as illustrative and not in a limiting sense.

We claim:

1. An incremental integrator comprising a first binary counter having a plurality of stages, first means for introducing into any selected one of said plurality of stages a stream of pulses representing variations in an independent quantity to produce a pulse output from the least significant bit stage at ½ of the pulse rate of said independent quantity, a pulse output from the second least significant bit stage at ¼ of the pulse rate of said independent quantity . . . a pulse output from the most significant bit stage "*n*" and $1/2^n$ of the pulse rate of said independent quantity, a second binary counter having at least the same number of stages as said first binary counter, second means for introducing into any selected one of said plurality of stages of said second counter a stream of pulses representing variations in a dependent quantity to produce a change in state of different ones of said plurality of stages in said second counter, a plurality of gate circuits each connected to one of the stages of said first counter and connected to one of the stages in the second counter in an inverse relationship with the least significant bit stage of said first counter and the most significant bit stage of said second counter being connected to a first of said gate circuits, the next least significant bit stage of said first counter and the next most significant bit stage of the second counter being connected to a second of said gate circuits . . . the most significant bit stage of said first counter and said least significant bit stage of said second counter being connected to an *n*th of said gate circuits to pass output pulses upon a particular change of state in a stage of said first counter and a particular state in its inversely related stage in said second counter, an output line connected to each of said gate circuits to receive the pulses passing from said gate circuits, and an additional plurality of gate circuits, each connected to the highest order stages of said second binary counter and operative to detect the one of said highest order stages which contains the most significant binary "one" for selecting the associated stage of said plurality of stages in said first counter as the one stage into which the stream of pulses representing variations in an independent quantity are introduced.

2. An incremental differential analyzer including means for providing a first plurality of discrete pulses representing digital variations in an independent quantity, a first plurality of counters for providing for the progression of signal indications through each counter to produce a pulse output from the least significant bit stage at ½ of the pulse rate of said independent quantity, a pulse output from the second least significant bit stage at ¼ of the pulse rate of said independent quantity . . . a pulse output from the most significant bit stage "*n*" at $1/2^n$ of the pulse rate of said independent quantity, first means for selecting a one of said counters into which the plurality of pulses will be introduced, means for providing a second plurality of discrete pulses representing digital variations in a dependent quantity, a second plurality of counters for providing signal indications digitally representing the count of discrete pulses in the second plurality, second means for selecting a one of said second counters into which the second plurality of pulses will be introduced, means for providing signal indications for operation of said second selecting means, gate means operative to pass signal indications upon the progression of signal indications in said first plurality of counters and the simultaneous occurrence of signal indications in the inversely related counter in the second plurality with the least significant bit stage of said first counter and the most significant bit stage of said second counter being connected to a first of said gate circuits, the next least significant bit stage of said first counter and the next most significant bit stage of the second counter being connected to a second of said gate circuits . . . the most significant bit stage of said first counter and said least significant bit stage of said second counter being connected to an *n*th of said gate circuits, means for detecting the most significant signal indication in said second plurality of counters and generating signals for operation of said first selecting means, and output circuit means operative upon the signals passing from said gate means and said detecting means to provide output signal indications representing the differential combination of the independent quantity and the dependent quantity.

3. An incremental differential analyzer including means for providing a first plurality of discrete pulses representing digital variations in an independent quantity, a first plurality of binary counters for providing for the progression of signal indications through each counter to produce a pulse output from the least significant bit stage at ½ of the pulse rate of said independent quantity, a pulse output from the second least significant bit stage at ¼ of the pulse rate of said independent quantity . . . a pulse output from the most significant bit stage "*n*" at $1/2^n$ of the pulse rate of said independent quantity, first scaling means for selecting a one of said counters into which the plurality of pulses will be introduced, means for providing a second plurality of discrete pulses representing digital variations in a dependent quantity, a second plurality of binary counters for providing signal indications digitally representing the count of discrete pulses in the second plurality, second scaling means for selecting a one of said second counters into which the second plurality of pulses will be introduced, means for providing signal indications for operation of said second selecting means, gate means operative to pass signal indications upon the progression of signal indications in said first plurality of counters and the simultaneous occurrence of signal indications in the inversely related counter in the second plurality with the least significant bit stage of said first counter and the most significant bit stage of said second counter being connected to a first of said gate circuits, the next least significant bit stage of said first counter and the next most significant bit stage of the second counter being connected to a second of said gate circuits . . . the most significant bit stage of said first counter and said least significant bit stage of said second counter being connected to an $n$th of said gate circuits, means for detecting the most significant binary "one" signal indication in said second plurality of counters and generating signals for operation of said first scaling means, whereby said first plurality of pulses is introduced in the one of first said binary counters which is paired with the one of said second binary counters containing the most significant binary "one," and output circuit means operative upon the signals passing from said gate means and said detecting means to provide output signal indications representing the differential combination of the independent quantity and the dependent quantity and the scale of the differential combination.

4. An incremental integrator comprising a first binary counter having a plurality of stages equal to a predetermined number of significant bits, first means for introducing into said plurality of stages a stream of pulses representing variations in an independent quantity to provide a pulse output from the least significant bit stage at ½ of the pulse rate of said independent quantity, a pulse output from the second least significant bit stage at ¼ of the pulse rate of said independent quantity . . . a pulse output from the most significant bit stage "$n$" at $1/2^n$ of the pulse rate of said independent quantity, a second binary counter having at least the same number of stages as said first binary counter, second means for introducing into said plurality of stages of said second counter a stream of pulses representing variations in a dependent quantity to produce a change in state of different ones of said plurality of stages in said second counter, rate multiplier means having a plurality of gate circuits each connected to one of the stages of said first counter and connected to one of the stages in said second counter in an inverse relationship with the least significant bit stage of said first counter and the most significant bit stage of said second counter being connected to a first of said gate circuits, the next least significant bit stage of said first counter and the next most significant bit stage of the second counter being connected to a second of said gate circuits . . . the most significant bit stage of said first counter and said least significant bit stage of said second counter being connected to an $n$th of said gate circuits, to pass output pulses upon a pulse output in a stage of said first counter and a pulse output in its inversely related stage in said second counter, and accumulating means including an output line connected to each of said gate circuits to receive said pulses passing from said gate circuits.

5. The incremental integrator of claim 4 in which there is provided an additional plurality of gate circuits each connected to a stage of said second binary counter and operative upon a particular change of state in the highest order of said stages for selecting the one of said plurality of stages in said first counter into which the stream of pulses representing variations in an independent quantity are introduced.

6. An incremental integrating system comprising, a first counter having a plurality of stages, means for energizing said stages to produce a predetermined digital pulse sequence representing variations in an independent quantity to provide a pulse output from the stage corresponding to the least significant bit at ½ of the pulse rate of said independent quantity, a pulse output from the stage corresponding to the second least significant bit at ¼ of the pulse rate of said independent quantity, . . . a pulse output from the stage corresponding to the most significant bit stage "$n$" at $1/2^n$ of the pulse rate of said independent quantity, at least one second binary counter having a plurality of stages, means for introducing into a selected one of plurality of stages of said second counter pulses in a second pulse sequence representing digital variations in a dependent quantity, a plurality of gate circuits each connected to one of the stages of said first counter and connected to a different one of the stages in said second counter in an inverse relationship with the least significant bit stage of said first counter and the most significant bit stage of said second counter being connected to a first of said gate circuits, the next least significant bit stage of said first counter and the next most significant bit stage of the second counter being connected to a second of said gate circuits . . . the most significant bit stage of said first counter and said least significant bit stage of said second counter being connected to an $n$th of said gate circuits to pass output pulses upon a pulse output in a stage of said first counter and a pulse output in its inversely related stage in said second counter, and accumulating means including an output line connected to each of said gate circuits to receive said pulses passing from said gate circuits.

References Cited in the file of this patent

UNITED STATES PATENTS

| | | |
|---|---|---|
| 2,841,328 | Steele et al. | July 1, 1958 |
| 3,029,023 | Beck et al. | Apr. 10, 1962 |
| 3,050,251 | Steele | Aug. 21, 1962 |